US006894244B2

(12) United States Patent
Groh

(10) Patent No.: US 6,894,244 B2
(45) Date of Patent: May 17, 2005

(54) METHOD FOR FABRICATING EMBOSSED ARTICLES BY FLASH WELDING

(75) Inventor: Jon Raymond Groh, Loveland, OH (US)

(73) Assignee: General Electric Company, Schenectady, NY (US)

(*) Notice: Subject to any disclaimer, the term of this patent is extended or adjusted under 35 U.S.C. 154(b) by 107 days.

(21) Appl. No.: 10/278,834

(22) Filed: Oct. 22, 2002

(65) Prior Publication Data

US 2004/0074878 A1 Apr. 22, 2004

(51) Int. Cl.[7] .............................................. B23K 11/04
(52) U.S. Cl. ...................................... 219/100; 219/103
(58) Field of Search .......................... 219/97, 100, 101, 219/103, 78.02

(56) References Cited

U.S. PATENT DOCUMENTS

| | | | | |
|---|---|---|---|---|
| 3,251,127 A | * | 5/1966 | Tonelli ........................ | 228/196 |
| 3,524,963 A | * | 8/1970 | Swengel ...................... | 219/100 |
| 3,656,094 A | * | 4/1972 | Haegert ....................... | 439/763 |
| 3,676,635 A | * | 7/1972 | Page et al. ................... | 219/92 |
| 3,770,933 A | * | 11/1973 | Holko et al. ................ | 219/107 |
| 4,020,315 A | * | 4/1977 | Euler ......................... | 219/56.22 |
| 4,159,408 A | | 6/1979 | Lifshits et al. | |
| 4,376,242 A | | 3/1983 | Buff et al. | |
| 4,689,465 A | * | 8/1987 | Pal ........................... | 219/117.1 |
| 5,270,514 A | | 12/1993 | Wechselberger et al. | |
| 6,025,569 A | * | 2/2000 | McCardle et al. ........... | 219/98 |
| 6,031,197 A | * | 2/2000 | Larsson ....................... | 219/53 |
| 6,160,237 A | * | 12/2000 | Schneefeld et al. ........ | 219/78.02 |
| 6,163,003 A | | 12/2000 | Battisti | |
| 6,294,752 B1 | | 9/2001 | Kuchuk-Yatsenko et al. | |
| 6,471,792 B1 | * | 10/2002 | Breedis et al. .............. | 148/433 |

OTHER PUBLICATIONS

Parker, Dictionary of Scientific and Technical Terms, 1989, McGraw–Hill, Fourth Edition, p. 907, 1170.*
Aerospace Material Specification AMS–7490, REV M, SAE International, 1991, 7 pages.

* cited by examiner

Primary Examiner—Kiley S. Stoner
Assistant Examiner—Kevin McHenry
(74) Attorney, Agent, or Firm—McNees Wallace & Nurick LLC

(57) ABSTRACT

An article with an embossment thereon is fabricated by providing an article precursor, providing an embossment precursor, and flash welding the embossment precursor and the article precursor together, to form the article with the embossment thereon.

15 Claims, 2 Drawing Sheets

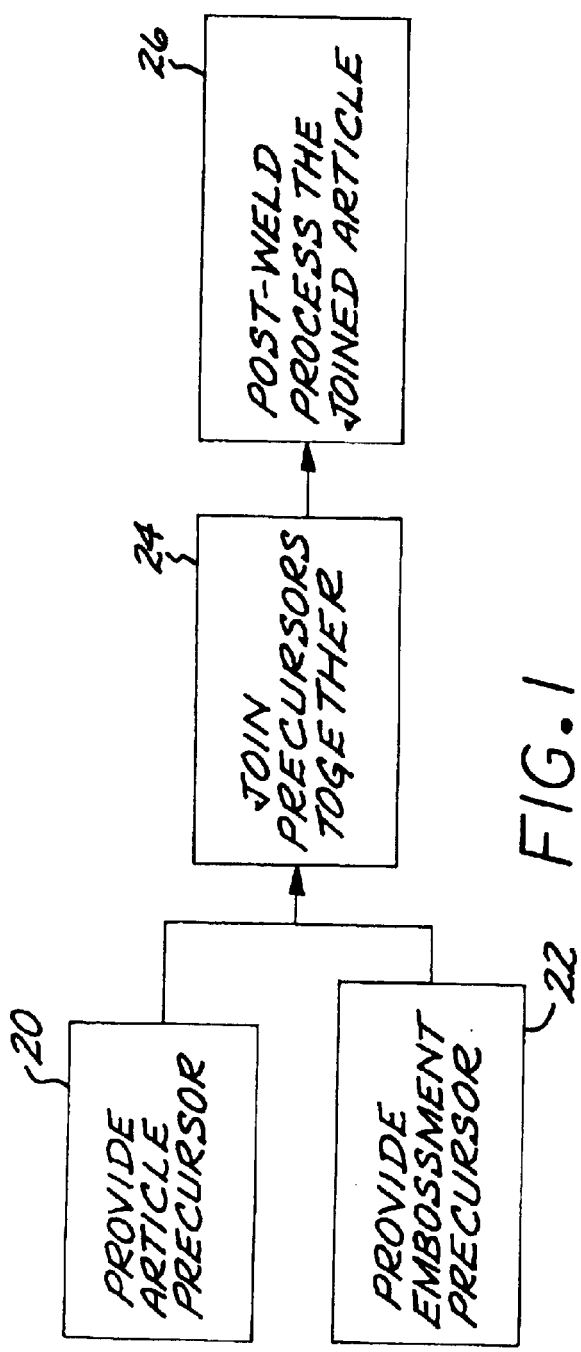
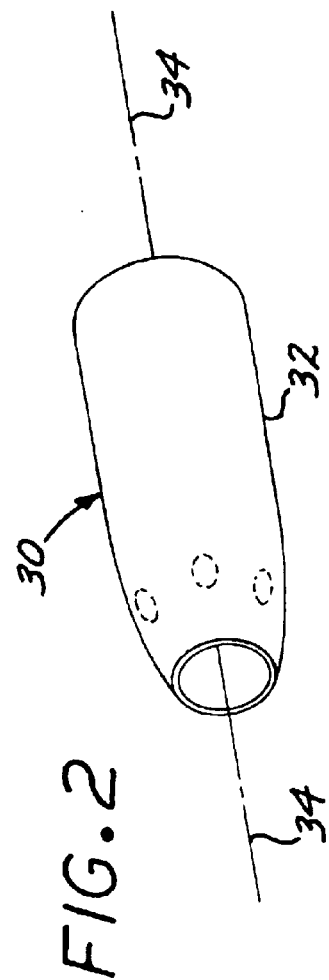

METHOD FOR FABRICATING EMBOSSED ARTICLES BY FLASH WELDING

This invention relates to the fabrication of an article having an embossment thereon and, more particularly, to the fabrication of such an article that is relatively thin, except for the embossment region.

BACKGROUND OF THE INVENTION

Thin-walled structures often require access ports or other openings through the basic structure. Such openings perform functions such as permitting the passage of tubing, providing visual or instrumentation inspection access, and mounting of operating elements to the thin-walled structure. An example of interest is the mounting of fuel nozzles and passage of the fuel lines to the fuel nozzles in a stator casing of a gas turbine engine.

The thickness of the thin-walled structure is usually selected to be no greater than necessary to carry its normal loadings at locations away from the opening, particularly in weight-sensitive applications such as a gas turbine engine. However, whenever there is such an opening in a thin-walled structure that must carry a significant applied loading during service, there is a stress concentration in the vicinity of the opening. To reduce loads at the opening, the thin-walled structure is typically thickened locally in the neighborhood of the opening. This local thickening is termed an "embossment". Embossments may also be formed at locations that are to be hardened, such as attachment points that are used to attach the thin-walled structure to other structure.

The embossment may be created in any of several ways. In one approach that is often used where the thin-walled structure is cylindrically symmetric and there are a number of openings arranged around the cylindrical circumference, an extra thickness of metal is cast or formed into the thin-walled structure around the cylindrical circumference. The excess portion of the extra thickness of material, at locations away from the locations where the openings are to be provided, is machined away. The removal of the excess material is usually costly, due to the machining expense and to the cost of the material that is machined away.

In another approach, the embossment material may be provided as a discrete piece and then joined to the thin-walled structure at the appropriate location. This technique requires the use of conventional fusion welding, inertial welding, diffusion bonding, or some other attachment technique. The attachment technique must be relatively inexpensive to employ, and must allow the joining of the embossment material of the desired shape and size. Fusion welding results in a cast interface between the thin-walled structure and the embossment that exhibits a reduced strength that is usually unacceptable in high-strength, weight-critical applications. Fusion welding is also prone to microfissure formation in difficult-to-weld alloys such as Rene™ 41 and Waspaloy. Solid state welding techniques such as diffusion bonding provide superior mechanical properties without microcracking, as the joint is not formed by solidification of molten metal. The resulting tensile strength and fatigue behavior are generally equal to or less than those of the parent metal. Solid state diffusion welding techniques, however, are generally rather slow and uneconomical to utilize for many applications. The use of inertial welding, another solid-state welding technique, limits the ability to create embossments of arbitrary shapes that have the proper orientation relative to the part axis, a significant shortcoming in many specialty applications.

There is a need for an improved approach to the fabrication of articles with embossments, particularly thin-walled structures that are used in weight-critical applications. The present invention fulfills this need, and further provides related advantages.

BRIEF SUMMARY OF THE INVENTION

The present invention provides an approach for fabricating an article with an embossment thereon. This approach is generally applicable, but it is particularly useful for thin-walled articles that require one or more embossments in the high-stress region. The embossment may be of any shape or thickness, and of the same material as the thin-walled structure or a different material.

A method for fabricating an article with an embossment thereon comprises the steps of providing an article precursor, providing an embossment precursor, and flash welding the embossment precursor and the article precursor together, to form the article with the embossment thereon. The article precursor is preferably a thin-walled article, wherein the wall thickness of the article precursor is less than about ½ of the thickness of the embossment precursor.

The article precursor may be, but is not limited to, a cylindrically symmetric article precursor, either in cast or wrought form. An example is a wrought stator casing of a gas turbine engine. The article precursor may be made of any operable material, such as a nickel-base or cobalt-base alloy, with examples being Alloy 718 or Waspaloy.

The embossment precursor may be peripherally uniform or not peripherally uniform. The embossment precursor may be made of any operable material, such as a nickel-base or cobalt-base alloy, with examples being Alloy 718 or Waspaloy. The embossment precursor and the article precursor may be made of the same materials having substantially the same compositions, or of different materials having different compositions.

In one form, a method for fabricating an article with an embossment thereon comprises the steps of providing an article precursor, providing an embossment precursor, and joining the embossment precursor and the article precursor together, to form the article with the embossment thereon. The step of joining including the step of solid state welding the embossment precursor and the article together by a process that does not rotate the embossment precursor relative to the article precursor, preferably with a voltage applied between the precursors and with flash welding being most preferred.

The step of joining may be performed by applying an electrical potential between the embossment precursor and the article precursor, while the embossment precursor and the article precursor are sufficiently separated that there is no current flow therebetween, thereafter moving the embossment precursor and the article precursor together such that there is current flow therebetween to locally increase the metal temperatures of the precursors, thereafter forcing the embossment precursor and the article precursor together, and thereafter discontinuing the electrical potential while the embossment precursor and the article precursor remain in contact. In one form of this approach, the embossment precursor and the article precursor are first moved together such that there is current flow therebetween, thereafter separated so that there is no current flow therebetween, and, upon reaching the desired local metal temperature, thereafter forced to fully contact the embossment precursor and the article precursor together. The steps of moving together and separating, prior to the full-contact forcing step, may be repeated several times.

This fabrication approach avoids the extensive machining that is required when a circumferential thickened region is machined away to define the embossments while retaining the parent metal properties. It is more generally applicable than inertial welding, inasmuch as the precise desired orientation in space of the embossment may be achieved with the present approach but not with inertial welding. The present approach is also suitable for affixing the embossment in regions that are inaccessible for inertial welding, such as the interiors of hollow structures. A metallurgically sound structure is produced by the present approach. The joining is a solid-state operation, minimizing the risk of deforming the thin-walled structure, minimizing any alteration of its microstructure, and minimizing the incidence of microfissure formation. The metallurgical joint formed between the embossment and the thin-walled structure is clean, with interfacial oxides and other contamination removed by the flash welding process. The present approach is less costly than inertial welding. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block flow diagram of an approach for practicing the invention;

FIG. 2 is a perspective view of an example of an article precursor;

DETAILED DESCRIPTION OF THE INVENTION

FIG. 1 depicts a method for fabricating an article with an embossment thereon. An article precursor 30, an example of which is shown in FIG. 2, is provided, step 20. The article precursor 30 is an article which, with the addition of an embossment and possible additional operations, becomes the desired article. The article precursor 30 may be of any operable type. Preferably, the article precursor 30 is a thin-walled article in which a wall thickness $t_{wall}$ in the neighborhood of the embossment is less than a thickness $t_{emboss}$ of the embossment, and is preferably less than ½ of $t_{emboss}$. The need to provide embossments is particularly great for such article precursors 30, to reduce stress concentrations at the locations of openings through the thin wall 32 or connections to the thin wall 32. The article precursor 30 of most interest is an article precursor that is generally cylindrically symmetric about a cylindrical axis 34. The article precursor 30 may be either as-cast ("cast") or cast and worked ("wrought"). The article precursor 30 of FIG. 2 is a precursor of a stator casing of a gas turbine engine, but the present invention is not so limited. The article precursor 30 may be made of any operable article material. Examples of article materials of most interest are nickel-base and cobalt-base alloys, with specific examples being Alloy 718, having a typical composition, in weight percent, of about 17.86 percent chromium, about 0.01 percent cobalt, about 18.06 percent iron, about 2.99 percent molybdenum, less than about 0.01 percent tungsten, about 0.03 percent copper, about 5.28 percent niobium, less than about 0.01 percent manganese, about 0.02 percent vanadium, less than about 0.01 percent tantalum, about 0.99 percent titanium, about 0.49 percent aluminum, about 0.03 percent carbon, less than about 0.1 percent zirconium, balance nickel and impurities, or Waspaloy, which has a typical composition, in weight percent, of about 19.02 percent chromium, about 13.13 percent cobalt, about 0.55 percent iron, about 4.18 percent molybdenum, about 0.01 percent niobium, about 0.02 percent tantalum, less than about 0.01 percent tungsten, less than about 0.01 percent copper, about 0.01 percent manganese, about 0.01 percent vanadium, less than about 0.01 percent silicon, about 2.98 percent titanium, about 1.41 percent aluminum, about 0.03 percent carbon, less than about 0.06 percent zirconium, balance nickel and impurities. The invention is not so limited, however.

Figure 3:
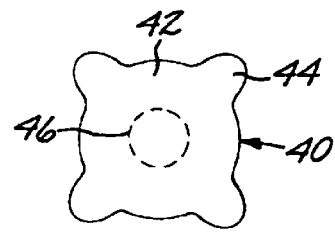
FIG. 3 is a plan view of an example of an embossment precursor.

An embossment precursor 40, an example of which is shown in FIG. 3, is provided, step 22. The embossment precursor 40 may be of any operable type and configuration. In all cases, it is provided as a piece of embossment material that is initially physically separate from the article precursor 30. The embossment precursor 40 is typically thicker than the article precursor 30 at the location where they are joined, but that need not be the case. The embossment precursor 40 is of any operable shape. It may be peripherally uniform, that is, uniform around its periphery. Alternatively, and as illustrated in FIG. 3, the embossment precursor 40 may be peripherally nonuniform, requiring control of the relative orientation of the embossment precursor 40 and the article precursor 30 during the welding process. In the case illustrated in FIG. 3, the embossment precursor 40 has an embossment body 42 and embossment ears 44 extending therefrom. Thus, it is not uniform around its periphery. The operability of the present approach for peripherally nonuniform embossment precursors is particularly significant, in view of the difficulty or impossibility in fabricating nonuniform embossments using some other possible techniques. The dashed line 46 in FIG. 3 represents the eventual location of an opening through the final embossment, but the opening may or may not be present in the embossment precursor 40. The embossment precursor 40, and thence the final embossment, may be solid or hollow. The embossment precursor 40 may be made of any operable embossment material. The embossment material may be the same material as the article material, or a different material. Examples of embossment materials of most interest are nickel-base and cobalt-base alloys, with specific examples being Alloy 718 and Waspaloy. The invention is not so limited, however.

The embossment precursor 30 and the article precursor 40 are joined together, step 24, to form the desired article with the embossment thereon while retaining acceptable microstructure and properties. The joining step 24 is preferably performed by solid state welding the article precursor 30 and the embossment precursor 40 together by a process that does not rotate the embossment precursor 40 relative to the article precursor 30. If the embossment precursor 40 were rotated relative to the article precursor 40, as in inertia or friction welding, it would be difficult or impossible to achieve a correct orientation of a peripherally nonuniform embossment precursor 40 relative to the article precursor 40.

The most preferred implementation of the joining step 24 is flash welding the embossment precursor 40 and the article precursor 30 together. Flash welding is a technique known for use in other applications, see for example U.S. Pat. Nos. 4,159,408; 4,376,242; 5,270,514; 6,163,003; and 6,294,752, whose disclosures are incorporated by reference. The applicable industry specification is AMS 7490.

Figure 4:
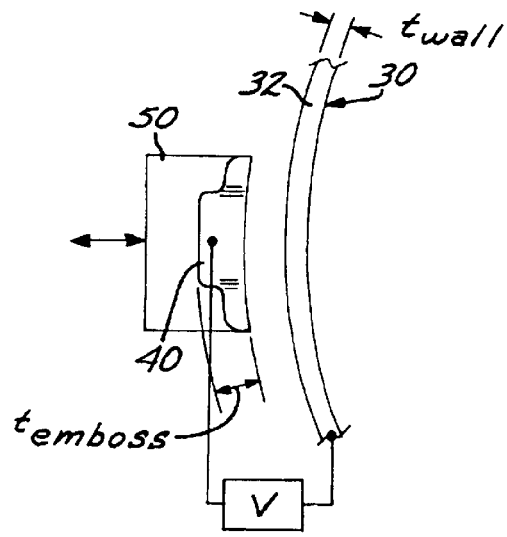
FIG. 4 is a schematic depiction of the flash welding operation.

In the presently preferred approach to the joining step 24 and as illustrated in FIG. 4, the embossment precursor 40, which typically is much smaller in size than the article precursor 30, is mounted in a linearly movable support 50. The article precursor 30 and the support 50 holding the embossment precursor 40 are positioned relative to each other so that the linear movement of the support 50 will bring the embossment precursor 40 into abutting contact with the article precursor 30 at the proper location where they are to be joined together. The article precursor 30 thereafter remains stationary in the usual case where it is much larger in size than the embossment precursor 40. An electrical voltage V, preferably an AC potential of a conventional industrial voltage, is applied between the embossment precursor 40 and the article precursor 30, while the embossment precursor 40 and the article precursor 30 are sufficiently separated that there is no current flow therebetween.

The embossment precursor 40 and the article precursor 30 are thereafter moved together by moving the support 50 linearly toward the article precursor 30 so that the embossment precursor 40 is nearly contacting the article precursor 30. There is electrical arcing between the article precursor 30 and the embossment precursor 40, also termed "flashing", so that an electrical current flows between the embossment precursor 40 and the article precursor 30. This electrical arcing occurs at the local high points of the two pieces 30 and 40. This "flashing" portion of the welding process locally heats the embossment precursor 40 and the article precursor 30 over the facing surfaces where they are to be joined, and also provides the benefit of eliminating surface oxides and contaminants from the surfaces to be joined. Optionally, the embossment precursor 40 and the article precursor 30 are thereafter separated by moving the support 50 linearly away from the article precursor 30 so that there is no current flow therebetween. The embossment precursor 40 is preferably oscillated toward and away from the article precursor 30, producing a series of flashes. The embossment precursor 40 and the article precursor 30 are locally heated by this arcing in the vicinity of the interface where they are to contact and be joined. The duration of the heating cycle is typically 1–20 seconds.

Thereafter and once the proper temperature (but less than the melting point of either the article precursor 30 or the embossment precursor 40) is reached, the embossment precursor 40 and the article precursor 30 are forced together while continuing the electrical current flow therebetween, to fully contact the embossment precursor 40 and the article precursor 30 together along their interface. This forceful contacting, amounting to an upsetting step much like forging, results in a local deformation of the metal of both the article precursor 30 and the embossment precursor 40 to form a clean, solid state, metallic bond. There is no general or local melting of the article precursor 30 or the embossment precursor 40 that would result in reduced properties in the final article. Any remaining surface oxides, other contamination, and impurities at the contacting surfaces are forced out of the contacting region by the pressure and the localized solid-state plastic flow of the metal at the interface into the "flash" material that surrounds the periphery of the welded region by the flashing substep(s) and the final forcing and upsetting step, so that they are removed from the final bond line. The electrical potential V and the upsetting force are thereafter discontinued while the embossment precursor 40 and the article precursor 30 remain in contact. After cooling, the flash material around the periphery of the weld line is trimmed away.

Figure 5:
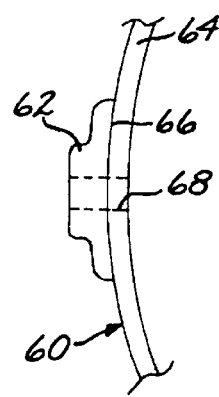
FIG. 5 is a schematic sectional view of a detail of a thin-walled article with an embossment.

The result as shown in FIG. 5 is an article 60 having an embossment 62 joined to an article body 64 along a weld line 66. Any post-welding, finishing processing steps 26 are then performed. In one type of finishing process step 26, there is a post-weld heat treatment. In another type of finishing processing 26, an opening 68 is machined or drilled through the facing portions of the embossment 62 and the article body 64. Alternatively, the article precursor 30 and the embossment precursor 40 may be furnished in steps 20 and 22, respectively, with openings therethrough which, when aligned, define the opening 68. Any operable use may be made of the embossment 62, such as using it to fasten the article 60 to another structure, or to fasten another structure to the article 60.

Figure 6:
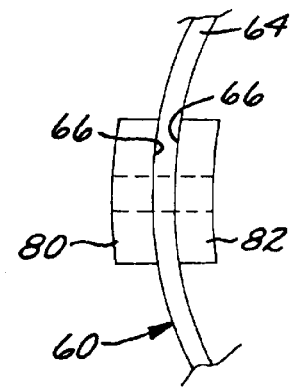
FIG. 6 is a schematic sectional view of another embodiment of the thin-walled structure with the embossment.

FIG. 6 depicts another embodiment. Here, a first embossment 80 is welded to one side of the wall 32, and a second embossment 82, aligned with the first embossment 80, is welded to the opposite side of the wall 32. During the flash welding process of step 24, the voltage V is applied between the two embossments 80 and 82.

In many instances, there are multiple embossments 62 or pairs of embossments 80/82 at different locations of the single article 60.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating an article with an embossment thereon, comprising the steps of:

providing an article precursor;

providing art embossment precursor; and flash welding the embossment precursor and the article precursor together, to form the article with the embossment thereon, wherein the step of flash welding does not heat either the embossment precursor or the article precursor to its melting point.

2. The method of claim 1, wherein the step of providing the article precursor includes a step of providing a thin-walled article precursor.

3. The method of claim 1, wherein the step of providing the article precursor includes a step of providing a cylindrically symmetric article precursor.

4. The method of claim 1, wherein the step of providing the article precursor includes a step of providing a cast cylindrically symmetric article precursor.

5. The method of claim 1, wherein the step of providing the article precursor includes a step of providing a wrought cylindrically symmetric article precursor.

6. The method of claim 1, wherein the step of providing the article precursor includes a step of providing a stator casing of a gas turbine engine.

7. The method of claim 1, wherein the step of providing the article precursor includes a step of providing the article precursor made of a nickel-base alloy or a cobalt-base alloy.

8. The method of claim 1, wherein the step of providing the embossment precursor includes a step of providing the embossment precursor that is not peripherally uniform.

9. The method of claim 1, wherein the step of providing the embossment precursor includes a step of providing the embossment precursor made of a nickel-base alloy or a cobalt-base alloy.

10. The method of claim 1, wherein the article precursor and the embossment precursor are of substantially the same composition.

11. The method of claim 1, wherein the article precursor and the embossment precursor are of different compositions.

12. A method for fabricating an article with an embossment thereon, comprising the steps of:

providing an article precursor;

providing an embossment precursor; and joining the embossment precursor and the article precursor together, to form the article with the embossment thereon, the step of joining including the step of solid state flash welding the article precursor and the embossment precursor together by a process that does not rotate the embossment precursor relative to the article precursor.

13. The method of claim 12, wherein the step of providing the article precursor includes a step of providing a thin-walled article precursor.

14. A method for fabricating an article with an embossment thereon, comprising the steps of:

providing an article precursor;

providing an embossment precursor; and joining the embossment precursor and the article precursor together, to form the article with the embossment thereon, the step of joining including the step of solid state welding the article precursor and the embossment precursor together by a process that does not rotate the embossment precursor relative to the article precursor, and wherein the step of joining includes steps of applying an electrical potential between the embossment precursor and the article precursor, while the embossment precursor and the article precursor are sufficiently separated that there is no current flow therebetween, thereafter moving the embossment precursor and the article precursor together such that there is current flow therebetween, thereafter forcing the embossment precursor and the article precursor together with a mechanical force, and thereafter discontinuing the electrical potential and the mechanical force while the embossment precursor and the article precursor remain in contact.

15. A method for fabricating an article with an embossment thereon, comprising the steps of:

providing an article precursor;

providing an embossment precursor; and joining the embossment precursor and the article precursor together, to form the article with the embossment thereon, the step of joining including the step of solid state welding the article precursor and the embossment precursor together by a process that does not rotate the embossment precursor relative to the article precursor, and wherein the step of joining includes steps of applying an electrical potential between the embossment precursor and the article precursor, while the embossment precursor and the article precursor are sufficiently separated that there is no current flow therebetween, thereafter moving the embossment precursor and the article precursor together such that there is current flow therebetween, thereafter separating the embossment precursor and the article precursor so that there is no current flow therebetween, thereafter forcing the embossment precursor and the article precursor together with a mechanical force such that there is initially a current flow therebetween, and continuing to force the embossment precursor and the article precursor together to fully contact the embossment precursor and the article precursor together, and thereafter discontinuing the electrical potential and the mechanical force while the embossment precursor and the article precursor remain in contact.

* * * * *